United States Patent
Chang et al.

(10) Patent No.: US 6,889,053 B1
(45) Date of Patent: May 3, 2005

(54) LIKELIHOOD-BASED GEOLOCATION PREDICTION ALGORITHMS FOR CDMA SYSTEMS USING PILOT STRENGTH MEASUREMENTS

(75) Inventors: Kirk K. Chang, Morganville, NJ (US);
Daniel R. Jeske, Eatontown, NJ (US);
Kiran M. Rege, Marlboro, NJ (US);
Yung-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/359,648

(22) Filed: Jul. 26, 1999

(51) Int. Cl.[7] .................................. H04Q 7/00
(52) U.S. Cl. ...................... 455/456.3; 455/456.5; 342/357.01; 342/450; 375/262
(58) Field of Search ..................... 370/342; 375/262; 342/357.01, 357.02, 450

(56) References Cited

U.S. PATENT DOCUMENTS

| | | | |
|---|---|---|---|
| 5,933,462 A | * 8/1999 | Viterbi et al. ............... | 375/262 |
| 6,249,252 B1 | * 6/2001 | Dupray ................... | 342/357.01 |
| 6,263,208 B1 | * 7/2001 | Chang et al. ............. | 455/456.3 |
| 6,496,701 B1 | * 12/2002 | Chen et al. ............... | 455/456.5 |
| 6,564,065 B1 | 5/2003 | Chang et al. ................ | 455/457 |
| 2001/0022558 A1 | * 9/2001 | Karr et al. ................... | 342/450 |

* cited by examiner

Primary Examiner—William D. Cumming (57) ABSTRACT

The location of a mobile wireless communication unit in the service area of a CDMA communications system is predicted utilizing two likelihood functions that define maximum likelihood estimators of the mobile unit's location, based on attribute measurements, such as but not limited to pilot signal strength, being made at the location of the mobile unit and reported back to a base station. One of the likelihood functions comprises a frequentist likelihood function and the other comprises a Bayesian-modified likelihood function. The likelihood functions are based on the assumption that there is an RF model which provides the probability a mobile unit is able to detect one or more attributes associated with an arbitrary base station, given it is located at an arbitrary location within the service area. Each of the likelihoods are also incorporated into a sequential Bayesian procedure which outputs a posterior distribution indicative of the location of the mobile unit.

16 Claims, 8 Drawing Sheets

FIG. 4E

LIKELIHOOD-BASED GEOLOCATION PREDICTION ALGORITHMS FOR CDMA SYSTEMS USING PILOT STRENGTH MEASUREMENTS

CROSS REFERENCE TO RELATED APPLICATIONS

This application is related to U.S. Ser. No. 09/139,107, now U.S. Pat. No 6,496,701 entitled "Pattern Recognition-Based Geolocation", filed in the names of T. C. Chiang et al on Aug. 26, 1998; U.S. Ser. No. 09/294,997 entitled "A Bayesian-Update Based Location Prediction Method for CDMA Systems", filed in the names of K. K. Chang et al on Apr. 20, 1999; and U.S. Ser. No. 09/321,729, now U.S. Pat. No. 6,263,208, issued on Jul. 17, 2001, entitled "Geolocation Estimation Method For CDMA Terminals Based On Pilot Strength Measurements", filed in the names of K. K. Chang et al on May 28, 1999. These related applications are assigned to the assignee of the present invention and are meant to be incorporated herein by reference.

BACKGROUND OF THE INVENTION

1. Field of the Invention

The present invention relates to a method of locating a mobile telephone unit within a cellular service area, and more particularly to a method of predicting the location of a CDMA mobile unit based upon the probability of its being at a particular location of the service area using an algorithm providing a likelihood estimation of the mobile unit's location in response to a sequential set of attributes observed by the mobile unit and reported back to a base station.

2. Description of Related Art

A cellular telephone system must be able to locate a mobile unit within a cellular service area under various RF propagation conditions such, for example, when an E911 call is made from the mobile unit. Conventional methods for locating a mobile unit are typically based on either a triangulation technique which requires signals from three or more base stations within a designated service area, or an angle of arrival technique which requires at least two base stations. In many areas, the number of base stations the mobile unit can detect is less than two. Furthermore, both the triangulation and angle of arrival techniques inherently suffer from inaccuracies and signal fading which result from multi-path propagation.

In the above-noted related patent application U.S. Pat. No. 6,496,701 entitled "Pattern Recognition-Based Geolocation", RF characteristics pertaining to one or more pilot signals radiated from a base station and specific to a particular location within the service area are detected by a mobile unit and transmitted back to a base station where they are matched to a known set of RF characteristics and other information obtained from making attribute information measurements at all the grid points (sub-cells) in a cellular service area and which are then stored in a database located, for example, in a base station server.

In the above-noted related patent application U.S. Ser. No. 09/294,997 entitled "A Bayesian-Update Based Location Prediction Method For CDMA systems", the invention is directed to a method of estimating, by a Bayesian probability algorithm, the location of a mobile unit in the service area of a CDMA cellular telephone system using a model based approach which, among other things, simplifies the generation of a database containing a pilot signal visibility probabilities. This eliminates the need for repeated attribute measurements at all of the grid points in the service area.

In the above-noted related patent U.S. Pat. No. 6,263,608 entitled "Geolocation Estimation Method For CDMA Terminals Based On Pilot Strength Measurements", the invention is directed to a method of estimating the location of a mobile unit in the service area of a CDMA cellular telephone system also using a model based approach, but which now eliminates the need for a stored database containing pilot signal visibility probabilities for all of the grid points or sub-cells in the cellular service area. The estimation procedure is based entirely on analytical results involving one or more key approximations derived, for example, from an integrated model of the wireless communications system, its RF environment, and attribute measurement.

SUMMARY

The subject invention is directed to predicting the location of a mobile wireless communication unit in the service area of a CDMA communications system utilizing two likelihood functions that define maximum likelihood estimators of the mobile unit's location, based on attribute measurements, such as but not limited to pilot signal strength, being made at the location of the mobile unit and reported back to a base station. One of the likelihood functions comprises a frequentist likelihood function and the other comprises a Bayesian-modified likelihood function. The likelihood functions are based on the assumption that there is an RF model which provides the probability a mobile unit is able to detect one or more attributes associated with an arbitrary base station, given it is located at an arbitrary location within the service area. The frequentist likelihood assumes the RF model provides exact visibility probabilities. In contrast, the Bayesian-modified likelihood assumes the RF model only provides reasonable approximations to the true visibility probabilities, and uses the approximations to construct a Bayesian prior distribution for the true values. Each of the likelihoods can be used in an iterative fashion to produce a maximum likelihood estimator for the location of the mobile unit by determining the coordinates within the service area which maximize the respective likelihood function. Alternatively, or in addition to, each of the likelihoods can be incorporated into a sequential Bayesian procedure which outputs a posterior distribution for the location of the mobile unit.

BRIEF DESCRIPTION OF THE DRAWINGS

FIG. 4 including FIGS. 4A–4E comprise flow charts which are illustrative of the preferred methods of determining the locality of a mobile unit in accordance with the subject invention.

DETAILED DESCRIPTION OF THE INVENTION

Figure 1:
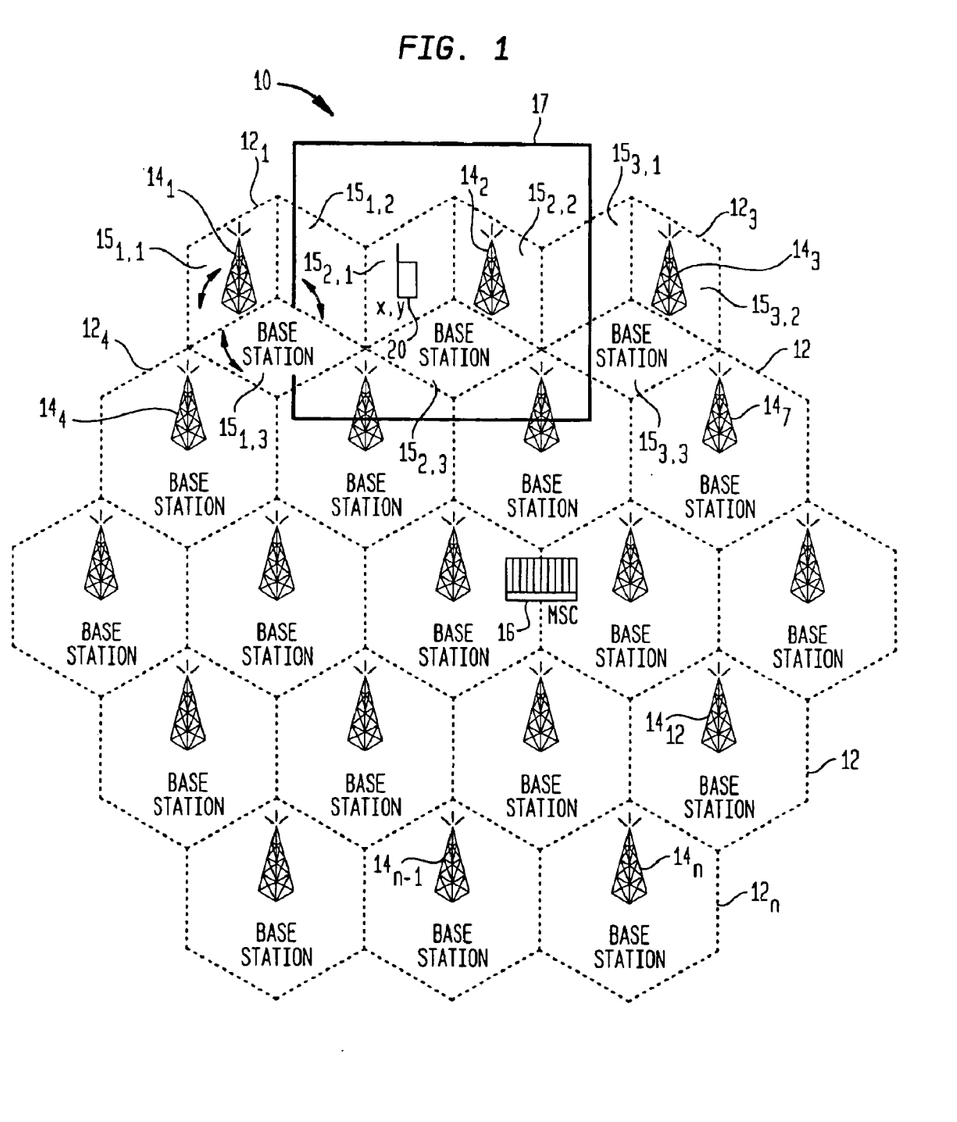
FIG. 1 is illustrative of a cellular service area divided into a plurality of cells.

Referring now to the drawings and more particularly to FIG. 1, the reference numeral 10 denotes a service area for a CDMA cellular telephone system partitioned into a plurality of contiguous cells $12_1, \ldots, 12_n$. FIG. 1 also depicts a plurality of base stations $14_1, \ldots, 14_n$ located within the service area 10. Also, the service area 10 includes at least one mobile switching center (MSC) 16. Typically each of the base stations $14_1, \ldots, 14_n$ has a sectorized antenna with a distinct pilot signal channel associated with each sector. Three sectored antennas are most common. Each sector of the antenna serves a corresponding sector of the associated cell. In FIG. 1, all of the base stations $14_1, \ldots, 14_n$ have three sectors each. The three sectors associated with base stations $14_1$, for example, are denoted by the symbols $15_{1,1}$, $15_{1,2}$ and $15_{1,3}$, respectively. A mobile unit 20 is shown in sector $15_{2,1}$.

Figure 2:
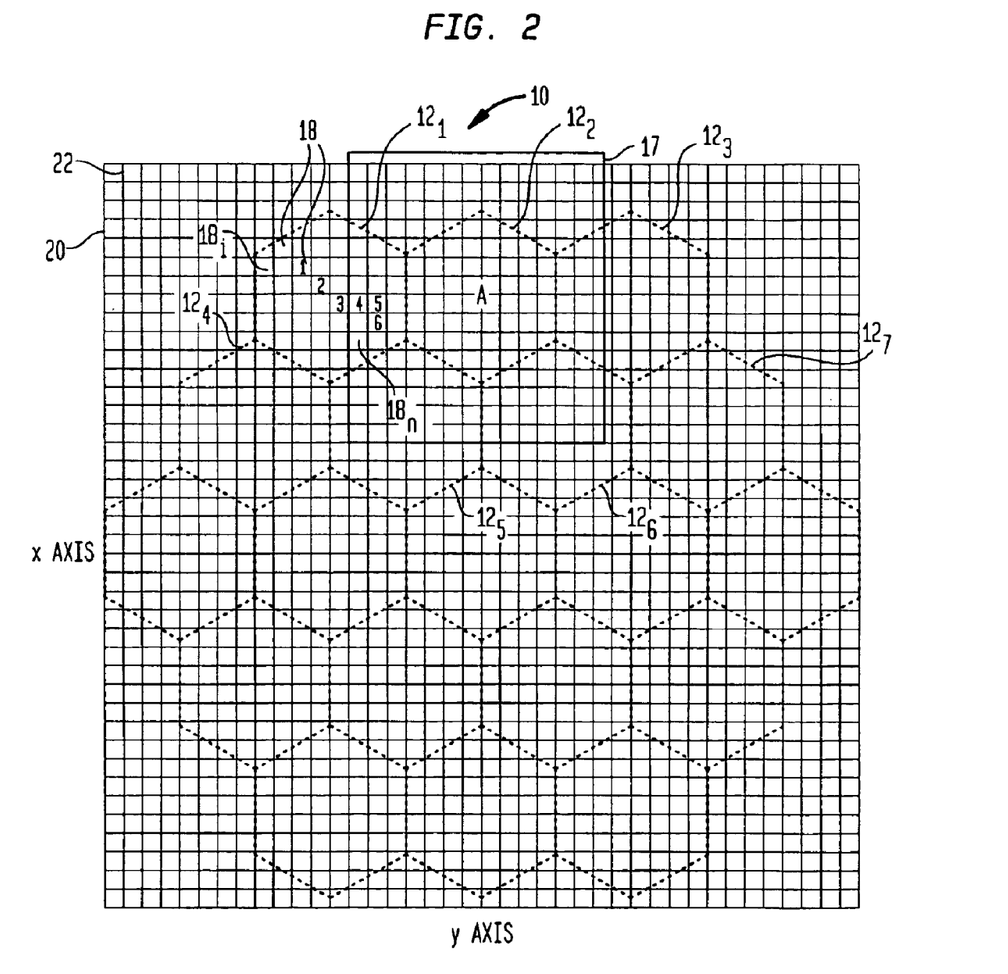
FIG. 2 is illustrative of the cells shown in FIG. 1 being further divided into sub-cells.

FIG. 2 is illustrative of the cells $12_1, \ldots, 12_n$ being further divided into sub-cells 18 and which are represented by a grid formed by rectilinear grid lines 20 and 22. The reference numbers $1, 2, 3 \ldots 6$ of FIG. 2 represent individual sub-cells $18_1, \ldots, 18_6$, respectively.

Figure 3:
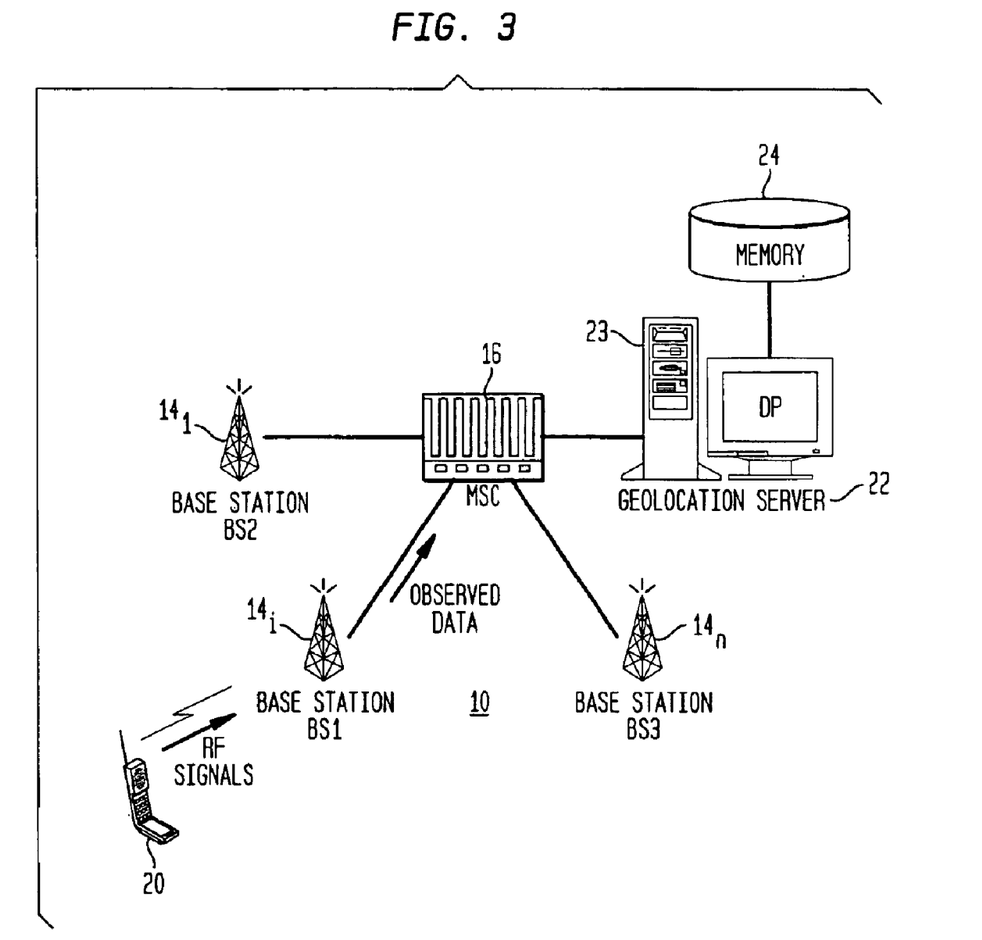
FIG. 3 is illustrative of an embodiment of the subject invention.

Turning attention now to FIG. 3, shown thereat is a diagram broadly illustrative of the system architecture for determining the location of a mobile unit 20 within the service area 10 in accordance with the subject invention. The MSC 16 operates in conjunction with the plurality of base stations $14_1, \ldots, 14_n$ and connects to the local telephone system, not shown. A server 22 including digital computer apparatus 23 and memory 24, for storing computation procedures, model parameters and system data, are typically located at the site of the MSC 16 for purposes which will now be explained.

In the invention described in the referenced related patent, U.S. Pat. No. 6,496,701 entitled "Pattern Recognition-Based Geolocation," each sub-cell $18_1, \ldots, 18_n$ of the service area 10 is identified by a set of observable characteristics which are referred to as attributes. Examples of attributes are pilot signal strengths (Ec/Io), phase-offsets, angles of arrival, and pilot round trip delays. The invention of U.S. Pat. No. 6,496,701 includes a database which contains attribute information which differentiates one sub-cell 18 from another and is generated by making a repeated and exhaustive survey which involves taking repeated measurements at all the sub-cells $18_1, \ldots, 18_n$ (FIG. 2) of the service area 10.

During the operation phase, after the database has been set up and the location service has been deployed, the mobile unit 20 detects and measures attribute values from its actual location in sub-cell $18_i$ and reports them via a message, e.g., a pilot signal strength measurement message (PSMM), to the base station(s) $14_1, \ldots, 14_n$ (FIG. 3), which can be one or more of the base stations with which it is in communication. The base station(s) forward their respective reported measurements to the geolocation server 22. The digital computer apparatus 23 associated with the server 22 statistically compares the measured values with the known attribute values stored in the database (memory) 24 of all the sub-cells 18 in the service area 10. The sub-cell $18_i$ whose attribute values as stored in the database provide the best match for the measurements reported by the mobile unit 20 is considered to be the best estimate of the mobile unit's location.

In the above-referenced related application, Ser. No. 09/294,997, entitled "A Bayesian-Update Based Location Prediction Method For CDMA systems", a database is also used to assist the process of location estimation. However, in contrast to the first referenced patent application, i.e. U.S. Pat. No. 6,496,701, it uses a model based approach to generate a database containing pilot visibility probabilities for different sub-cells 18 in the service area 10. The model-based approach requires that a limited number of pilot strength measurements be carried out along a few representative routes in the service area 10. These measurements are then used to identify the parameters of the model that characterizes the service area and its RF environment. Once these parameters are identified, simulations are then carried out to populate the database containing the pilot visibility probabilities, which are used in the computation of the location distribution of a mobile unit requesting location service. An iterative procedure based on a Bayesian probability computation is then used to obtain improved estimates of the mobile unit's location in response to multiple sets of attribute measurements being reported by the mobile unit 20. The model-based approach eliminates the need to carry out extensive measurements required by the first named invention, U.S. Pat. No. 6,496,701.

In the above-referenced related patent U.S. Pat. No. 6,263,208, entitled "Geolocation Estimation Method For CDMA Terminals Based On Pilot Strength Measurements", the model-based approach embodied in Ser. No. 09/294,997, "A Bayesian-Update Based Location Prediction Method . . . " to characterize the RF environment is used, as is the iterative procedure for computing the Bayesian posterior distribution for the location of the mobile. However, the database containing pilot visibility probabilities is replaced by analytical formulas that can be evaluated in real time. The evaluation procedures are compact and can typically be evaluated in the digital computer apparatus 23 shown in FIG. 3.

Considering the present invention, the analytic formulation for the pilot visibility probabilities taught in the above-referenced patent, U.S. Pat. No. 6,263,208, "Geolocation Estimation Method For CDMA terminals Based On Pilot Strength Measurements", now serve as the starting point for the derivation of two likelihood functions, hereafter referred to as the frequentist and Bayes-modified likelihood functions, respectively. Each of the likelihood functions is derived based on the assumptions and mathematical formulations described in attached Appendix A. In as much as the likelihood functions depend on the analytic evaluation of the pilot visibility probabilities, attached Appendix B provides a self-contained development of the relevant details of these formulas. Each likelihood function is a function of (x,y), an arbitrary location of the mobile unit 20 in the x and y grid shown in FIG. 2. Accordingly, each likelihood function is used in a first method to obtain a maximum likelihood (ML) estimator of the location of the mobile unit 20 by finding the (x,y) coordinates which maximizes the value of the respective likelihood function. An iterative technique for sequentially updating each ML estimator with additional pilot signal strength measurements is utilized. In a second method, each of the two likelihood functions are also incorporated into a sequential Bayesian procedure, which outputs a posterior distribution for the location of the mobile unit.

The Bayes-modified likelihood function, whether it is used in the context of ML estimation or a sequential Bayesian procedure, is a substantial deviation from the inventions disclosed in the second and third above referenced related applications in the following way. Both of these previously disclosed inventions use an RF model to estimate pilot visibility probabilities, the former via simulation techniques, the latter via analytical formula evaluation, and implicitly assume that the model holds precisely. The present invention, however, uses the same RF model only to determine the means of beta distributions that are used as Bayesian priors for the true (unknown) pilot visibility probabilities. A beta distribution is completely determined once its mean and variance have been specified. Subject to the fixed mean values, each of the beta distributions is fully specified by maximizing their variances. Maximizing the variance of the beta priors, subject to the specified mean values, is consistent with a non-informative (vague) prior specification.

A summary of the derivations which appear in Appendix A will now be given as prefatory remarks to the description of the overall mobile unit 20 location prediction process depicted in FIG. 4. In the example shown in FIGS. 1 and 2, if the primary base station for the mobile unit 20 is 14$_2$, the region designated as 17 in FIGS. 1 and 2 is the set of feasible locations of the mobile unit 20, and will hereafter be referred to as the region A. Along with the region A, the set of all pilots K which are likely to be visible at some of the grid points 18 in the set A is defined.

For each $(x,y) \in A$, let $\theta_{ij}(x,y)$ denote the true probability that the mobile unit 20 is able to see the pilot in sector j of base station i when it is located at (x,y). From hereon, the notation ij will be used to exclusively reference pilots from the set K. Let $\tilde{\theta}_{ij}(x,y)$ denote an approximation of $\theta_{ij}(x,y)$ based on an RF model described in Appendex B. For each pilot ij, let $\mu_{ij}^s$ equal one or zero depending on whether the mobile unit 20 can see pilot ij at the s-th measurement epoch or not, respectively. The frequentist likelihood through the first s measurement epochs has the following recursive form, starting with the definition $L_{ML}^0(x,y) \equiv 1$:

$$L_{ML}^s(x, y) \propto L_{ML}^{s-1}(x, y) \prod_{ij \in K} [\tilde{\theta}_{ij}(x, y)]^{\mu_{ij}^s} [1 - \tilde{\theta}_{ij}(x, y)]^{1-\mu_{ij}^s}, \quad (1)$$

$$(x, y) \in A$$

For the Bayes-modified likelihood, the prior for $\theta_{ij}(x,y)$ is a beta distribution with parameters:

$$\alpha_{ij}(x, y) = \begin{cases} 1, & \text{if } \tilde{\theta}_{ij}(x, y) \leq 1/2 \\ \dfrac{\tilde{\theta}_{ij}(x, y)}{1 - \tilde{\theta}_{ij}(x, y)}, & \text{if } \tilde{\theta}_{ij}(x, y) > 1/2 \end{cases} \quad (2)$$

$$\beta_{ij}(x, y) = \begin{cases} \dfrac{1 - \tilde{\theta}_{ij}(x, y)}{\tilde{\theta}_{ij}(x, y)}, & \text{if } \tilde{\theta}_{ij}(x, y) \leq 1/2 \\ 1, & \text{if } \tilde{\theta}_{ij}(x, y) > 1/2. \end{cases} \quad (3)$$

The Bayes-modified likelihood function through the first s measurement epochs has the following recursive form starting with the definition $L_{BML}^0(x,y) \equiv 1$ for all $(x,y) \in A$:

$$L_{BML}^s(x, y) \propto L_{BML}^{s-1}(x, y) \prod_{ij \in K} \frac{[n_{ij}^{s-1} + \alpha_{ij}(x, y)]^{\mu_{ij}^s}[s - 1 - n_{ij}^{s-1} + \beta_{ij}(x, y)]^{1-\mu_{ij}^s}}{\alpha_{ij}(x, y) + \beta_{ij}(x, y) + s - 1}, \quad (4)$$

$$(x, y) \in A$$

where $$n_{ij}^{s-1} = \sum_{k=1}^{s-1} \mu_{ij}^k$$

is the number of times pilot ij was visible amongst the first s−1 measurement epochs.

Each of the likelihood functions (1) and (4) are functions of $(x,y) \in A$, an arbitrary possible location for the mobile unit 20. The ML estimator for the location of the mobile unit 20 is obtained by evaluating (1) for all $(x,y) \in A$ and selecting the values, say $(x_{ML}^s, y_{ML}^s)$, which gives the largest value of (1). An updated ML estimate is produced at each measurement epoch. In a similar way, using function (4) rather than function (1) generates a sequence of Bayes-modified ML estimates, say $(x_{BML}^s, y_{BML}^s)$.

Utilizing functions (1) or (4) with a Bayesian sequential procedure can generate an alternative sequence of predictions for the location of the mobile unit 20. In each case, the initial prior distribution for the location of the mobile unit 20 is assumed to be a discrete uniform distribution of the form:

$$P_{ML}^0(x, y) = P_{BML}^0(x, y) = \frac{1}{\|A\|}, \; (x, y) \in A \quad (5)$$

where $\|A\|$ is the number of grid points $18_1, \ldots, 18_n$ contained within A. The posterior distribution for the location of the mobile unit 20, through s measurement epochs, based on the frequentist likelihood function (1) is, up to a constant of proportionality:

$$P_{ML}^s(x, y) \propto P_{ML}^{s-1}(x, y) \prod_{ij \in K} [\tilde{\theta}_{ij}(x, y)]^{\mu_{ij}^s} [1 - \tilde{\theta}_{ij}(x, y)]^{1-\mu_{ij}^s}, \quad (6)$$

$$(x, y) \in A.$$

Alternatively, the posterior distribution of the location of the mobile unit 20, through s measurement epochs, based on the Bayes-modified likelihood function (4) is, up to a constant of proportionality:

$$P_{BML}^s(x, y) \propto P_{BML}^{s-1}(x, y) \prod_{ij \in K} \frac{[n_{ij}^{s-1} + \alpha_{ij}(x, y)]^{\mu_{ij}^s}[s - 1 - n_{ij}^{s-1} + \beta_{ij}(x, y)]^{1-\mu_{ij}^s}}{\alpha_{ij}(x, y) + \beta_{ij}(x + y) + s - 1}, \quad (7)$$

$$(x, y) \in A.$$

A Bayesian sequence of predictions on where the mobile unit 20 is located follows from functions (6) or (7) by using the mean or mode of the posterior distribution obtained at each measurement epoch. When function (7) is used, the sequence of prediction involves two distinct prior distributions, beta and discrete uniform, and the methodology is referred to as doubly-Bayesian. This completes the summary of Appendix A.

A description of the mobile unit 20 location prediction process depicted in FIG. 4 will now be given. Considered in light of the accompanying appendices A and B and referring to FIGS. 4A–4E, the location prediction process in accordance with the subject invention, as noted above, is implemented in software which resides in the computer apparatus 23 located at the geolocation server 22 (FIG. 3).

The process, referred to hereinafter as the geolocation process, begins at step 30 (FIG. 4A) where it is waiting for a new location request to arrive. The geolocation process continually checks for the arrival of a location request at step 32, and if no such request has arrived, it goes back to the waiting state (step 30). When a location service request arrives, the geolocation process identifies the domain of support, i.e., the set of feasible locations, for the mobile's location based on either the identity of the primary base station of the mobile unit or the identity of the strongest pilot signal reported by the mobile unit. This is indicated in step 34. Pilot signals will hereinafter be referred to simply as "pilots."

In the example shown in FIGS. 1 and 2, if the primary base station for the mobile unit is base station 14$_2$, the region designated 17 in FIGS. 1 and 2 would be selected as the domain of support for the mobile's location and will be hereinafter referred to as the region A. Along with the region A, the geolocation process at step 34 also identifies the set of all pilots K which are likely to be visible at some of the gridpoints 18 in the region A. Next, in step 36 approximations for the conditional probability, conditioned on the mobile unit being at a location (x,y)∈A, that each pilot in K is visible to the mobile are computed using equation (B9) from Appendix B. At this point, two decisions external to the geolocation process must be made. The first decision (step 38) that must be made is which of the ML estimation or sequential Bayes estimation methods should be used. For each estimation procedure (ML or sequential Bayes) the second decision to be made is which type of likelihood, frequentist or Bayes-modified, should be used (steps 40 and 42). These two decisions result in the four paths marked (2)–(5). FIGS. 4B–4E correspond to each of the four paths, only one of which would typically be used in any implementation of the geolocation process.

Figures 4, 4A:
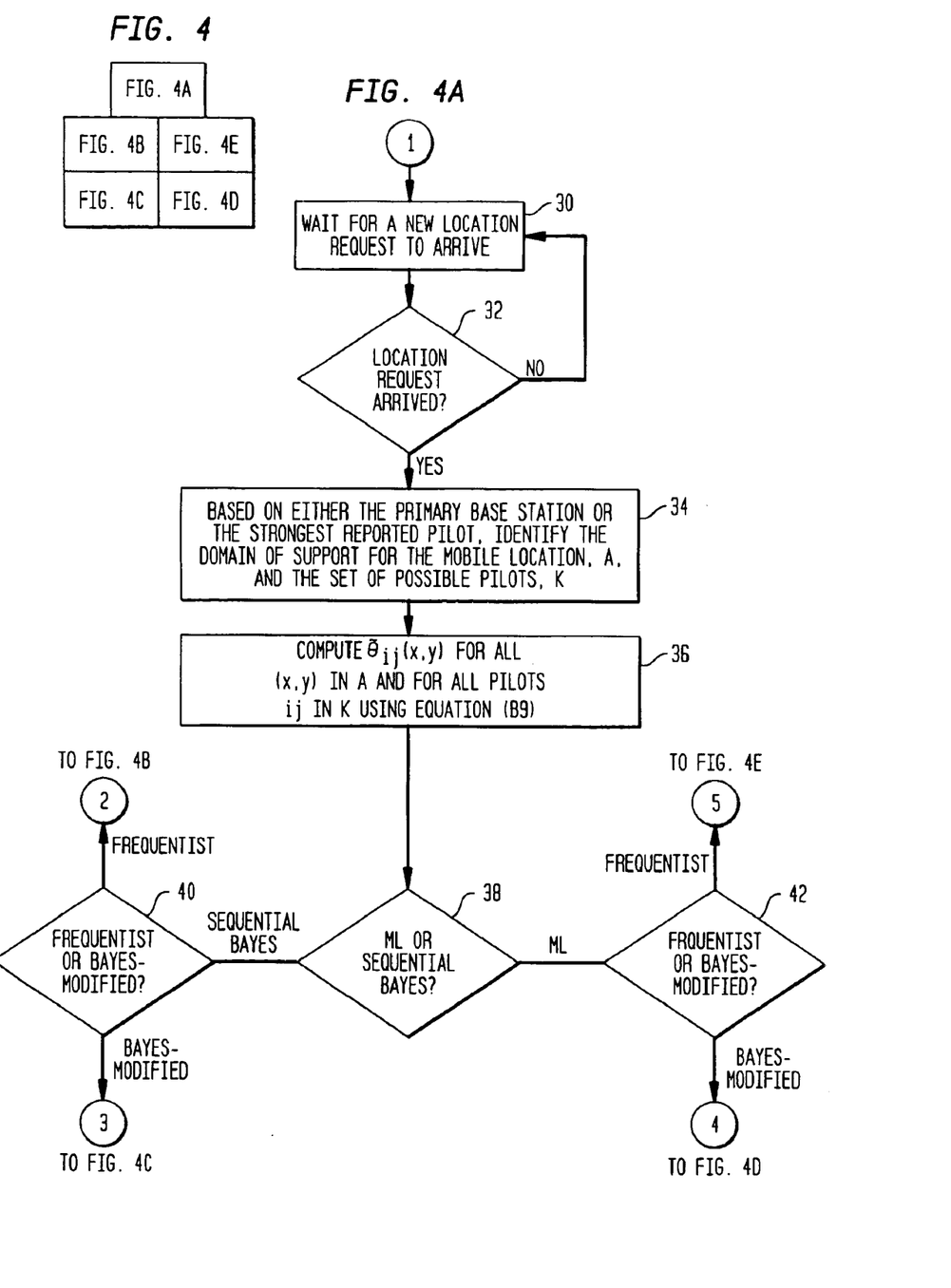
Figure 4B:
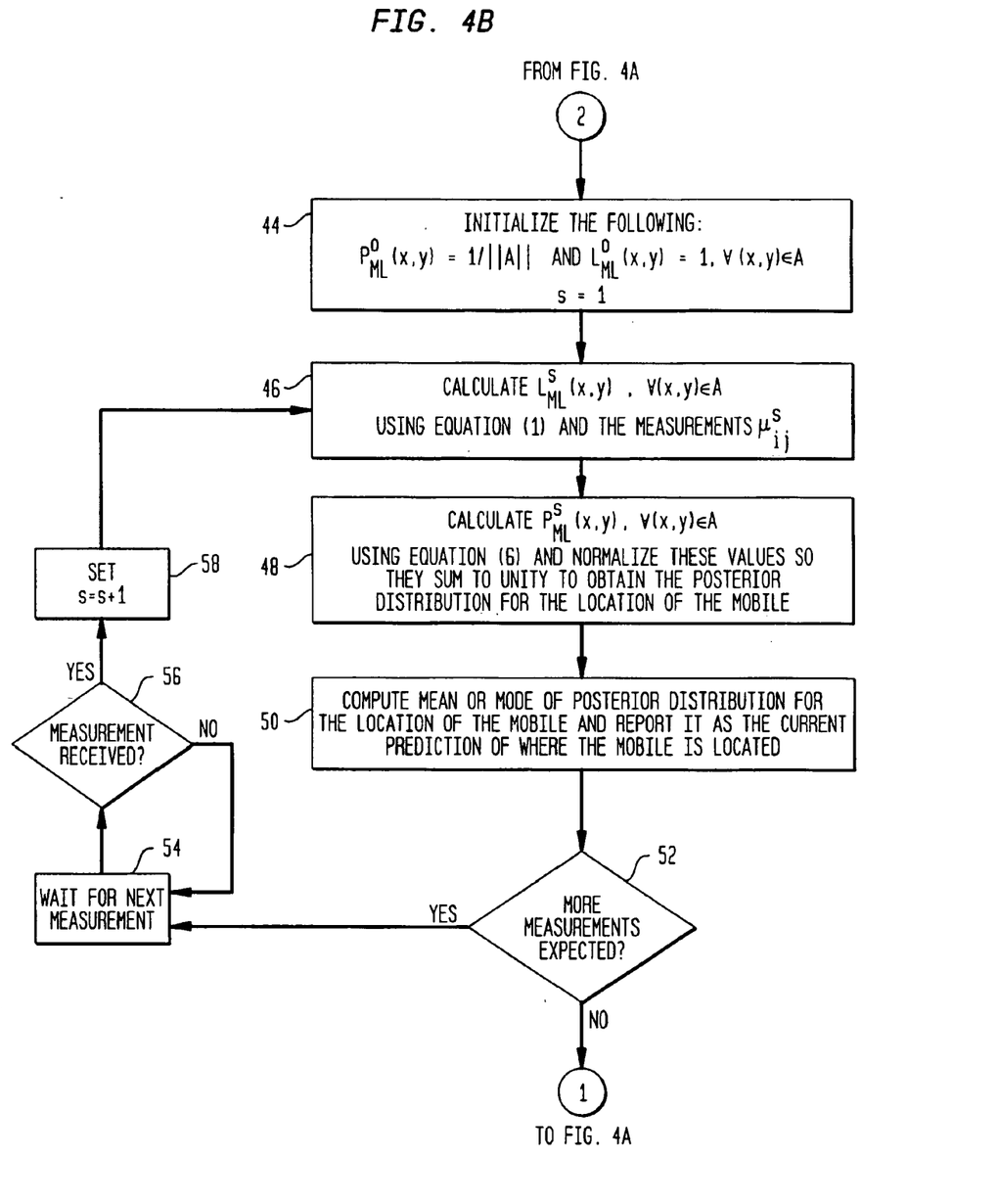

First, suppose path (2) of FIG. 4A is chosen which represents the combination of the sequential Bayes estimation method and the frequentist likelihood function. This is shown in FIG. 4B. There step 44 assigns a discrete uniform prior probability to all grid points 18 in the set A. The discrete uniform prior reflects the initial state of no information about the mobile unit's whereabouts, other than the fact that it resides in the region A. The frequentist likelihood function is initialized to unity and time is set to s=1. Step 46 then evaluates the frequentist likelihood based on the first set (s=1) of visibility measurements using expression (1) noted above. In step 48, the posterior distribution based on the first set of visibility measurements is evaluated using function (6). Expression (6) results in values that must be normalized so that when they are summed over all (x,y)∈A, the result will be unity. The posterior distribution gives the updated probability distribution for the location of the mobile unit 20. A prediction of the location for the mobile unit 20 is next obtained in step 50 by computing either the mean or mode of the posterior distribution obtained from step 48. The prediction obtained in step 50 corresponds to the first set of measurements (s=1). If no further measurements are expected, the geolocation process terminates, otherwise as shown in step 52 it proceeds to a waiting state (step 54) and stays there (via step 56) until another set of measurements is received. At that point, the geolocation process proceeds to step 58 and increments time up to s+1 before proceeding back to step 46 and looping once again through step 48 and step 50 which lead to an updated prediction for the location of the mobile unit 20. Eventually, no further measurements will be expected and the geolocation process will terminate at step 52.

Figure 4C:
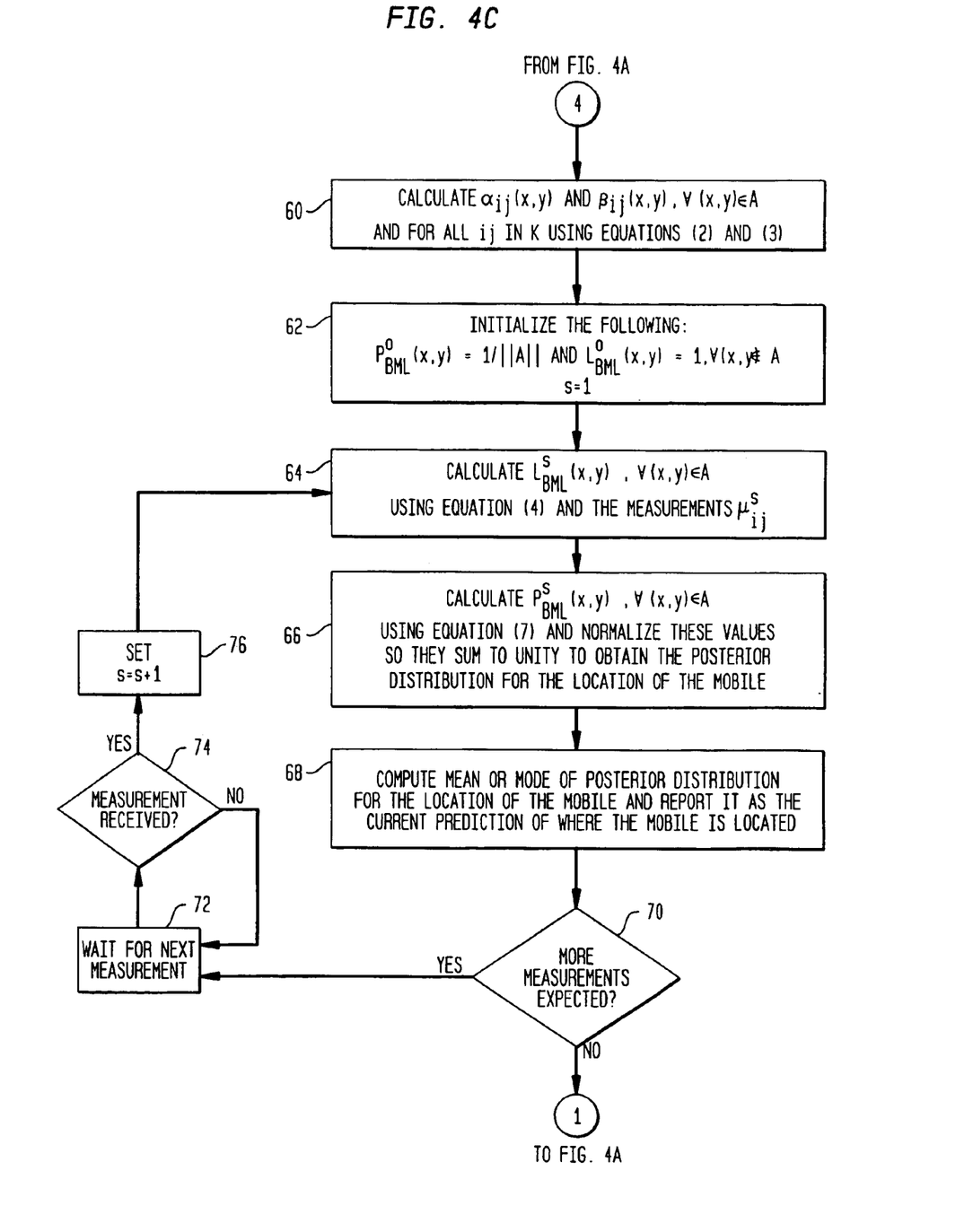

Next, suppose path (3) of FIG. 4A, which is depicted in FIG. 4C, is chosen which represents the combination of the sequential Bayes estimation method and the Bayes-modified likelihood function. Step 60 directs the calculation, via equations (2) and (3), noted above, of the two parameters for the beta prior distribution that is used for the true unknown pilot visibility probabilities. Step 62 assigns a discrete uniform prior probability to all grid points 18 in the set A. The discrete uniform prior reflects the initial state of no information about the mobile unit's whereabouts, other than the fact that it resides in the region A. The Bayes-modified likelihood function is initialized to unity and time is set to s=1. Step 64 then evaluates the Bayes-modified likelihood based on the first set (s=1) of visibility measurements using functional expression (4). In step 66, the posterior distribution based on the first set of visibility measurements is evaluated using equation (7). Equation (7) gives values that must be normalized so that when they are summed over all (x,y)∈A, the result will be unity. The posterior distribution gives the updated probability distribution for the location of the mobile unit 20. A prediction of the location for the mobile unit 20 is obtained in step 68 by computing either the mean or mode of the posterior distribution obtained from step 66. The prediction obtained in step 68 corresponds to the first set of measurements (s=1). If no further measurements are expected, the geolocation process terminates, otherwise as shown in step 70 it proceeds to a waiting state (step 72) and stays there (via step 74) until another set of measurements is received. At that point, the geolocation process proceeds to step 76 and increments time up to s+1 before proceeding back to step 64 and looping once again through step 66 and step 68 which lead to an updated prediction for the location of the mobile unit 20. Eventually, no further measurements will be expected and the geolocation process will terminate at step 70.

Figure 4D:
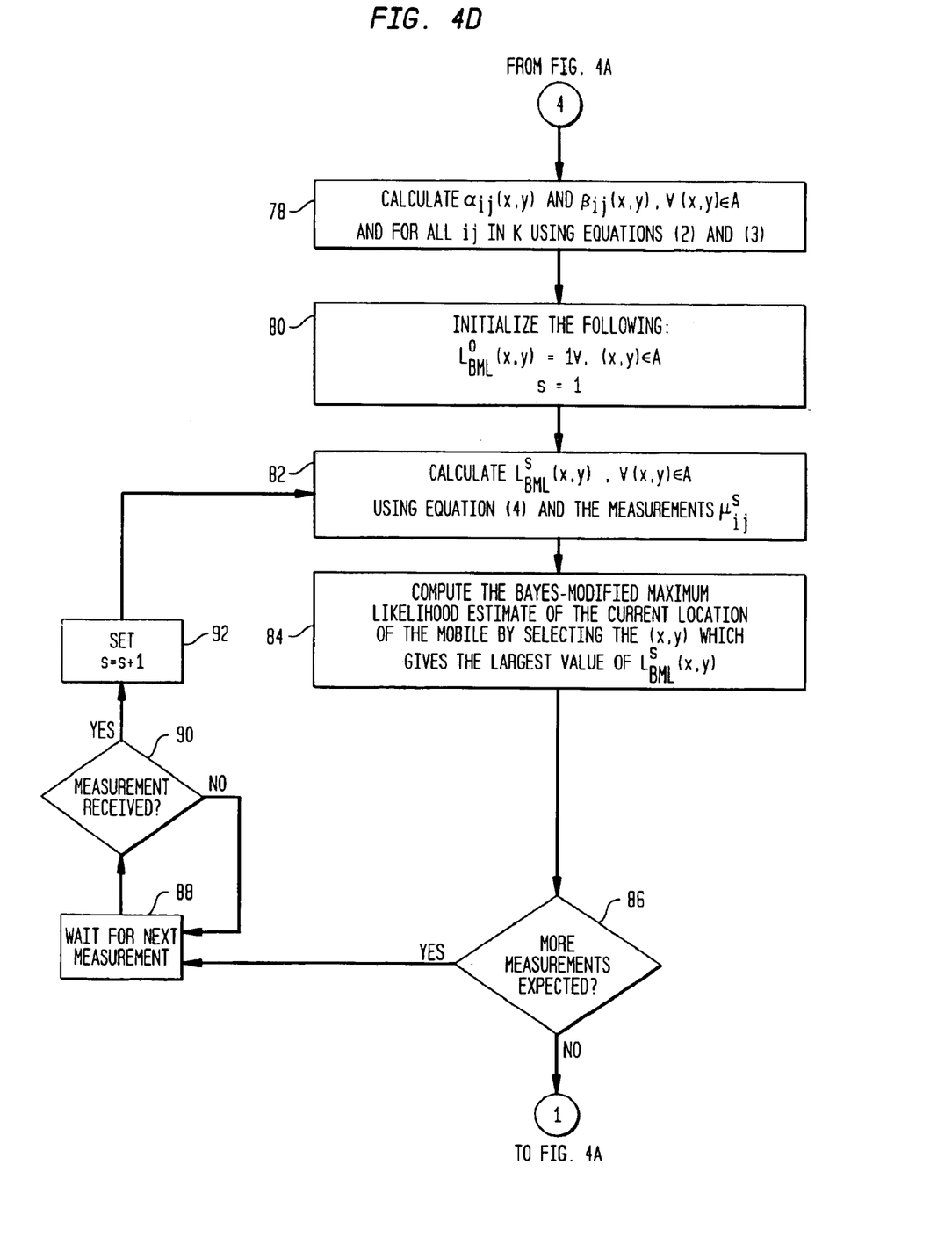

Next, suppose path (4) of FIG. 4A is chosen which represents the combination of the ML estimation method and the Bayes-modified likelihood function. Path (4) is shown in FIG. 4D where step 78 first directs the calculation, via equations (2) and (3), of the two parameters for the beta prior distributions that are used for the true unknown pilot visibility probabilities. Step 80 initializes the Bayes-modified likelihood function to unity and time is set to s=1. Step 82 then evaluates, for all (x,y)∈A, the Bayes-modified likelihood based on the first set (s=1) of visibility measurements using expression (4). In step 84, the value of (x,y)∈A which gives the largest likelihood value is selected as the Bayes-modified maximum likelihood estimator of the mobile unit's location The estimate obtained in step 84 corresponds to the first set of measurements (s=1). If no further measurements are expected, the geolocation process terminates, otherwise as shown in step 86 it proceeds to a waiting state (step 88) and stays there (via step 90) until another set of measurements is received. At that point, the geolocation process proceeds to step 92 and increments time up to s+1 before proceeding back to step 82 and step 84 which lead to an updated prediction for the location of the mobile unit 20. Eventually, no further measurements will be expected and the geolocation process will terminate at step 86.

Figure 4E:
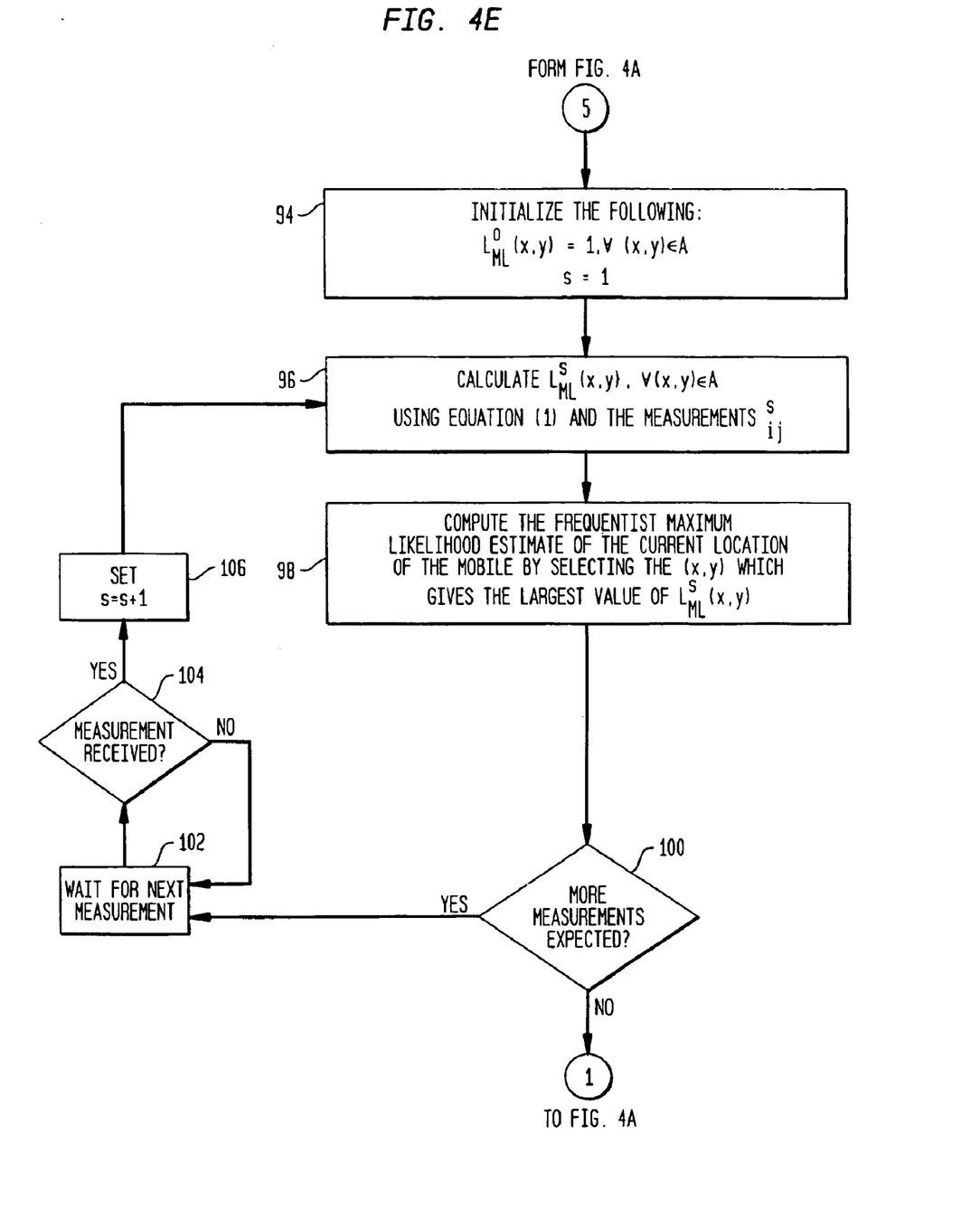

Finally, suppose path (5) of FIG. 4A and further shown in FIG. 4E, is chosen which represents the combination of the ML estimation method and the frequentist likelihood function. As shown, step 94 initializes the frequentist likelihood function to unity and time is set to s=1. Step 96 then evaluates, for all (x,y)∈A, the frequentist likelihood based on the first set (s=1) of visibility measurements using functional expression (1). In step 98, the value of (x,y)∈A which gives the largest likelihood value is selected as the maximum likelihood estimator of the mobile unit's location. The estimate obtained in step 98 corresponds to the first set of measurements (s=1). If no further measurements are expected, the geolocation process terminates, otherwise as shown in step 100 it proceeds to a waiting state (step 102) and stays there (via step 104) until another set of measurements is received. At that point, the geolocation process proceeds to step 106 and increments time up to s+1 before proceeding back to step 96 and step 98 which lead to an updated prediction for the location of the mobile unit 20. Eventually, no further measurements will be expected and the geolocation process will terminate at step 100.

Each of the iterative procedures described above with respect to paths (2)–(5), operates to provide an improved estimate of the location of the mobile unit 20 as more and more sets of pilot measurements are reported. Each of the procedures can be readily extended to include other measured quantities such as phase offsets by including those data in the respective likelihood formulations. Also, when desirable, the method of the present invention can be modified so that the actual signal strength of the visible pilots can be used rather than a binary representation of the fact that the pilots are or are not visible.

The foregoing description of the preferred embodiment has been presented to illustrate the invention without intent to be exhaustive or to limit the invention to the form disclosed. In applying the invention, modification and variations can made by those skilled in the pertaining art without departing from the scope and spirit of the invention. It is intended that the scope of the invention be defined by the claims appended hereto, and their equivalents.

Appendix A

Derivation of the Frequentist and Bayes-modified Likelihood Functions

The notation used in this Appendix is the same as what has been introduced in the main portion of this application. In what follows, we make the following assumptions:

(i) The visibility of a particular pilot at $(x,y) \in A$ at a given time t is independent of whether the pilot was visible at any time s<t, and is independent of t as well.

(ii) The visibility of pilot i at time t is independent of the visibility of pilot j ($j \neq i$) at time t.

(iii) Throughout the duration of the prediction process, the mobile is relatively stationary, i.e., the mobile unit remains in its initial sub-cell.

Defining $L^0(x,y)=1$, $\forall (x,y) \in A$, a recursive form for the exact likelihood function through the first s measurement epochs for the unknown location of the mobile based on (i)–(iii) is $$L^s(x,y) \propto L^{s-1}(x,y) \prod_{ij \in K} [\theta_{ij}(x,y)]^{\mu_{ij}^s}[1-\theta_{ij}(x,y)]^{1-\mu_{ij}^s}, \quad (A1)$$

$(x,y) \in A.$

The functions $\theta_{ij}(x,y)$ in (A1) are unknown, so the exact likelihood function is not calculable. Replacing the $\theta_{ij}(x,y)$ with their approximations $\tilde{\theta}_{ij}(x,y)$, defined by equation (B9) in Appendix B, gives the definition of the frequentist likelihood function $L_{ML}^s(x,y)$ shown in expression (1).

The frequentist likelihood function (1) was derived under the assumption that a family of functions $\tilde{\theta}_{ij}(x,y)$ accurately approximate the unknown functions $\theta_{ij}(x,y)$. The approximations $\tilde{\theta}_{ij}(x,y)$ are based on the RF model described in Appendix B. The RF model is an approximation to a very complex stochastic process. Bayesian methods allow the uncertainty associated with $\tilde{\theta}_{ij}(x,y)$ to be incorporated into the model framework. Rather than assuming $\theta_{ij}(x,y) \equiv \tilde{\theta}_{ij}(x,y)$, we can model the parameters $\theta_{ij}(x,y)$ with independent prior distributions that have mean values equal to $\tilde{\theta}_{ij}(x,y)$. For each $(x,y) \in A$, we use a prior distribution for $\theta_{ij}(x,y)$ that is a beta distribution with probability density function given by $$f_{\theta_{ij}(x,y)}(u) = \frac{1}{B[\alpha_{ij}(x,y), \beta_{ij}(x,y)]} u^{\alpha_{ij}(x,y)-1}(1-u)^{\beta_{ij}(x,y)-1}, \quad (A2)$$

$0 \leq u \leq 1$ where $B[\cdot,\cdot]$ is the complete beta function. Note that the two parameters, $\alpha_{ij}(x,y)$ and $\beta_{ij}(x,y)$ to be determined in what follows, depend on both the possible location $(x,y) \in A$ and the pilot ij $\in$ K. Whereas the frequentist likelihood is defined by implicitly assuming $\Pr[\theta_{ij}(x,y)=\tilde{\theta}_{ij}(x,y)]=1$, the Bayes-modified likelihood is defined by taking the expected value of the exact likelihood (A1) with respect to the beta distributions defined by (A2). The recursive form of the exact likelihood (A1) does not amend itself to evaluating the expected value as easily as the non-recursive form of the exact likelihood which is $$L^s(x,y) \propto \prod_{ij \in K} [\theta_{ij}(x,y)]^{n_{ij}^s}[1-\theta_{ij}(x,y)]^{s-n_{ij}^s}, \quad (x,y) \in A \quad (A3)$$

where $n_{ij}^s$ is the number of times pilot ij was visible through the first s measurement epochs. Evaluating the expected value of (A3), with respect to the beta distributions defined by (A2) gives the Bayes-modified likelihood function $$L_{BML}^s(x,y) \propto E\left\{\prod_{ij \in K}[\theta_{ij}(x,y)]^{n_{ij}^s}[1-\theta_{ij}(x,y)]^{s-n_{ij}^s}\right\} \quad (A4)$$

$$= \prod_{ij \in K} \frac{B[n_{ij}^s + \alpha_{ij}(x,y), s - n_{ij}^s + \beta_{ij}(x,y)]}{B[\alpha_{ij}(x,y), \beta_{ij}(x,y)]},$$

$(x,y) \in A.$

It is easily verified that equation (A4) has the recursive form shown in the functional expression (4).

The definition of the Bayes-modified likelihood function will be complete once values for $\alpha_{ij}(x,y)$ and $\beta_{ij}(x,y)$ are specified. Determining what values to use for $\alpha_{ij}(x,y)$ and $\beta_{ij}(x,y)$ is an example of the classic Bayesian dilemma—how to specify a prior distribution? An underlying principle in specifying a prior distribution is that any available information about the parameter of interest, in this case $\theta_{ij}(x,y)$, should be reflected in the prior distribution that is used. In this case, we have an approximation of $\theta_{ij}(x,y)$ from the RF model, namely $\tilde{\theta}_{ij}(x,y)$, which we will use as the mean of the prior distribution for $\theta_{ij}(x,y)$. Accordingly, we have the following constraint:

$$\frac{\alpha_{ij}(x,y)}{\alpha_{ij}(x,y) + \beta_{ij}(x,y)} = \tilde{\theta}_{ij}(x,y). \quad (A5)$$

Since we have two unknowns, $\alpha_{ij}(x,y)$ and $\beta_{ij}(x,y)$, we need one additional constraint to uniquely determine both $\alpha_{ij}(x,y)$ and $\beta_{ij}(x,y)$. To obtain the second constraint, we impose that the prior be as vague as possible, subject to the first constraint. To implement this second constraint, we will maximize the variance of the prior, subject to the fixed mean value. The second constraint is consistent with the quantity of the prior knowledge we have about $\theta_{ij}(x,y)$ and except for anticipating a value near $\tilde{\theta}_{ij}(x,y)$, we know nothing else about its potential value. We also restrict attention to beta distributions which have bounded density functions, implying $\alpha_{ij}(x,y) \geq 1$ and $\beta_{ij}(x,y) \geq 1$. The restriction to bounded density functions only rules out "U-shaped and "Slide-shaped" beta distributions which would not typically be intuitive representations of the prior information on $\theta_{ij}(x,y)$.

The problem of selecting $\alpha_{ij}(x,y)$ and $\beta_{ij}(x,y)$ has now been sufficiently constrained so that it can be solved by using the following Lemma.

Lemma

Consider the family of beta distribution with parameters $a \geq 1$ and $b \geq 1$. The values of a and b which maximize the variance, subject to the distribution having a given mean value $\mu$, are: $a=1$ and $b=(1-\mu)/\mu$, if $\mu \leq \frac{1}{2}$; $a=\mu/(1-\mu)$ and $b=1$, if $\mu > \frac{1}{2}$.

Proof of Lemma

The variance of the beta distribution is given by $\sigma^2 = ab/[(a+b+1)(a+b)^2]$. Since we have $\mu=a/(a+b)$, we can write $b=a(1-\mu)/\mu$, and hence $\sigma^2=\mu^2(1-\mu)/(a+\mu)$. To maximize the variance, we need to minimize a, subject to the constraint that both $a \geq 1$ and $b \geq 1$. Clearly, if $\mu \leq \frac{1}{2}$ then we can choose $a=1$ and $b=(1-\mu)/\mu \geq 1$ will be ensured. Likewise, if $\mu > \frac{1}{2}$ then the smallest we can choose a and still have $b \geq 1$ is $a=\mu/(1-\mu) \geq 1$.

Applying the Lemma with $a=\alpha_{ij}(x,y)$, $b=\beta_{ij}(x,y)$ and $\mu=\theta_{ij}(x,y)$ gives the formulas in equations (2) and (3) for $\alpha_{ij}(x,y)$ and $\beta_{ij}(x,y)$.

Appendix B

Derivation of the Approximations to the Pilot Visibility Probabilities

In this Appendix, we drive the approximations $\theta_{ij}(x,y)$ of the pilot visibility probabilities. The notation used in this Appendix is the same as what has been introduced earlier in this specification. Consider a grid point $(x,y) \in A$. As in the above-referenced related patent U.S. Pat. No. 6,263,208, entitled, "Geolocation Estimation Method For CDMA Terminals Based On Pilot Strength Measurements", the RF power received by the mobile unit 20 from sector j of base station i is modeled by the expression $$R_{ij}(x,y) = T_{ij} G_{ij}(x,y) L_{ij}(x,y) F_{ij}(x,y) M_{ij}(x,y) \qquad (B1)$$

where $T_{ij}$ is the transmit power associated with the sector, $G_{ij}(x,y)$ is the antenna gain for the sector along the direction pointing towards the location $(x,y) \in A$, $L_{ij}(x,y)$ is the distance loss between the base station associated with the sector and the location $(x,y) \in A$, $F_{ij}(x,y)$ is the shadow fading factor and $M_{ij}(x,y)$ is the measurement noise factor, all in absolute, not dB, units. The measurement noise factor is meant to include the effects of fast fading (e.g., Rayleigh/Rician) as well as inaccuracies in the measurement process. If $\gamma$ denotes the fraction of $T_{ij}$ that is used for the pilot channel, then $\gamma R_{ij}(x,y)$ is the pilot channel power received by the mobile unit 20 when it is located at $(x,y) \in A$.

The model assumes that the distance loss $L_{ij}(x,y)$ can be expressed as $$L_{ij}(x,y) = C_P [d_{ij}(x,y)]^{-\alpha} \qquad (B2)$$

where $d_{ij}(x,y)$ is the distance between the base station associated with the sector and the location $(x,y) \in A$, and $C_P$ and $\alpha$ are constants. Typically, $C_P$ takes a value in the range $10^{-15}$ to $10^{-10}$ and $\alpha$ is between 3 and 5 when $d_{ij}(x,y)$ is expressed in miles. The two parameters, $C_P$ and $\alpha$, moreover are environment specific.

The shadow fading factor, $F_{ij}(x,y)$, models the impact of terrain and large structures (e.g., buildings) on signal propagation which create deviations around the signal attenuation predicted by the deterministic path loss factor. We assume that $F_{ij}(x,y)$ is lognormally distributed and thus can be written as $$F_{ij}(x,y) = e^{-\frac{1}{2}\sigma_\phi^2} e^{\phi_{ij}(x,y)} \qquad (B3)$$

where $\phi_{ij}(x,y)$ is a zero mean Gaussian random variable with standard deviation $\sigma_\phi$.

The measurement noise factor, $M_{ij}(x,y)$ is also assumed to have a lognormal distribution so that we can write $$M_{ij}(x,y) = e^{-\frac{1}{2}\sigma_\mu^2} e^{\mu_{ij}(x,y)} \qquad (B4)$$

where $\mu_{ij}(x,y)$ is a zero mean Gaussian random variable with standard deviation $\sigma_\mu$.

Assume now that the pilot strength measurement carried out and reported to the base station by the mobile unit 20 is the Ec/Io value of the corresponding pilot channel signal. This value is the ratio of the pilot channel power from the concerned sector received by the mobile unit 20 to the total power received by the mobile unit including thermal noise, and possibly external interference.

By letting $P_{ij}(x,y)$ denote the strength of the pilot channel associated with the sector as measured by the mobile unit 20 located at $(x,y) \in A$, it follows that $$P_{ij}(x,y) = \frac{\gamma R_{ij}(x,y)}{N_o + \sum_{kl \in K} R_{kl}(x,y)} \qquad (B5)$$

where $N_0$ denotes thermal noise and external interference and (as before) kl is shorthand notation for the pilot associated with sector l of base station k.

For convenience, we define $$C_{ij}(x,y) = T_{ij} G_{ij}(x,y) L_{ij}(x,y). \qquad (B6)$$

Observe that the expected value of $R_{ij}(x,y)$ is equal to $C_{ij}(x,y)$. It is implicitly assumed that the shadow fading and measurement noise factors are uncorrelated. We approximate $P_{ij}(x,y)$ (B5) by the following expression $$Z_{ij}(x,y) = \frac{\gamma R_{ij}(x,y)}{N_0 + R_{ij}(x,y) + \sum_{\substack{kl \in K \\ kl \neq ij}} C_{kl}(x,y)}. \qquad (B7)$$

The difference between (B7) and (B5) is that for $kl \neq ij$, the $R_{kl}(x,y)$ quantities have been replaced by their mean values. Using (B3) and (B4), we can write $$Z_{ij}(x,y) = \frac{be^\xi}{a + ce^\xi} \qquad (B8)$$

where $$a = e^{\frac{1}{2}(\sigma_\phi^2 + \sigma_\mu^2)} \left[ N_0 + \sum_{\substack{kl \in K \\ kl \neq ij}} C_{kl}(x,y) \right]$$

$$b = \gamma C_{ij}(x,y)$$

$$c = C_{ij}(x,y)$$

-continued $$\xi = \phi_{ij}(x, y) + \mu_{ij}(x, y).$$

The probability that the mobile unit receives pilot ij with a signal strength in excess of T is $$\theta_{ij}(x,y) = Pr[P_{ij}(x,y) > T]$$
$$\approx Pr[Z_{ij}(x,y) > T]$$
$$= \tilde{\theta}_{ij}(x,y).$$

It can be easily shown that $$\tilde{\theta}_{ij}(x, y) = Q\left[-\frac{Ln\left(\frac{b}{a}T^{-1} - \frac{c}{a}\right)}{\sigma}\right] \quad (B9)$$

where $\sigma = (\sigma_\phi^2 + \sigma_\mu^2)^{\frac{1}{2}}$ and $Q(u) = \frac{1}{\sqrt{2\pi}} \int_{kl}^{\infty} e^{-\frac{1}{2}t^2} dt.$ Note that the expression for $\theta_{ij}(x,y)$ depends on the following unknown parameters: $\sigma_\phi^2, \sigma_\mu^2, N_0, C_P$ and $\alpha$. As in the above noted related application entitled, "Geolocation Estimation . . . ", in the present invention, pilot strength measurements are first carried out along a small number of representative routes in the service area. The measurements so obtained are then used to select values of $\sigma_\phi^2, \sigma_\mu^2, N_0, C_P$ and $\alpha$ which provide the best fit between the predicted pilot visibility probabilities, using equation (B9), and the observed pilot visibility probabilities.

What is claimed is:

1. A method of predicting the location of a CDMA mobile communications unit in a wireless communications service area, comprising the steps of:
   (a) receiving measure attribute information from a mobile unit location in the service area, said attribute information being specific to the location of the mobile unit in the service area;
   (b) computing the probability of the mobile unit being at a specific location in the service area in response to said received attribute information using a likelihood probability function, said likelihood probability function having an iterative procedure for generating a maximum likelihood estimator of the mobile unit's location in this service area, wherein said likelihood probability function includes a frequentist likelihood function;
   (c) generating an output indicative of the likelihood of the mobile unit being at said location in the service area.

2. A method according to claim 1 wherein the maximum likelihood estimator comprises the coordinates in the service area which maximizes the likelihood probability function.

3. A method of predicting the location of a CDMA mobile communications unit in a wireless communications service area, comprising the steps of:
   (a) receiving measured attribute information from a mobile unit location in the service area, said attribute information being specific to the location of the mobile unit in the service area;
   (b) computing the probability of the mobile unit being at a specific location in the service area in response to said received attribute information using a likelihood probability function;
   (c) generating an output indicative of the likelihood of the mobile unit being at said location in the service area;
   wherein said likelihood probability function includes an iterative procedure for producing a maximum likelihood estimator of the mobile unit's location in this service area wherein said likelihood probability function comprises a Bayes-modified likelihood function.

4. A method according to claim 1 wherein said procedure comprises sequential Bayesian procedure characteristics.

5. A method according to claim 4 wherein said sequential Bayesian procedure characteristics are implemented as a frequentist likelihood function.

6. A method according to claim 1 wherein said attribute information comprises a pilot signal strength measurement of at least one visible pilot signal at said location of the mobile unit.

7. A method according to claim 6 and additionally including a step (d) prior to step (b) of reducing the effective size of the service area so as to reduce the number of computations required in step (b).

8. A method according to claim 6 and following step (a) and before step (b), additionally including a step (d) of identifying a region A of support for the mobile unit in the service area and (e) identifying a set of possible pilot signals which can be detected by the mobile unit in said region of support.

9. A method according to claim 8 and additionally including a step (f) of computing an approximation $\theta_{ij}(x,y)$ of the probability the mobile unit detects a pilot signal at said specific location (x,y) in said region A for all pilot signals in said set of possible pilot signals and where j is a sector of a multi-sector based station I in said region of support.

10. A method according to claim 9 wherein $\theta_{ij}(x,y)$ is derived from an RF model for the RF power $R_{ij}(x,y)$ received by the mobile unit and where the model is of the form of $$R_{ij}(x,y) = T_{ij} G_{ij}(x,y) L_{ij}(x,y) F_{ij}(x,y) M_{ij}(x,y)$$

where $T_{ij}$ is the transmit power associated with sector j of base station I, $G_{ij}(x,y)$ is the antenna gain for the sector j of base station I along the direction pointing towards the location (x,y) within A, $L_{ij}(x,y)$ is the distance loss between the base station I associated with the sector j and the location (x,y) within A, $F_{ij}(x,y)$ is the shadow fading factor and $M_{ij}(x,y)$ is the measured noise factor.

11. A method according to claim 10 wherein said attribute information comprises the measured visibility of a pilot signal transmitted from a base station and the likelihood probability function comprises an iterative frequentist maximum likelihood (ML) function in the form of $$L_{ML}^s(x, y) \propto L_{ML}^{s-1}(x, y) \prod_{ij \in K} \left[\tilde{\theta}_{ij}(x, y)\right]^{\mu_{ij}^s} \left[1 - \tilde{\theta}_{ij}(x, y)\right]^{1-\mu_{ij}^s}, (x, y) \in A$$

where x and y comprise rectilinear coordinates in the service area A, s is the number of measurement epochs, and $\mu_{ij}^s$ is equal to one or zero depending on whether the mobile unit can detect a pilot signal ij at measurement epoch s.

12. A method of predicting the location of a CDMA mobile communications unit in a wireless communications service area, comprising the steps of:
   (a) receiving measure attribute information from a mobile unit location in the service area, said attribute information being specific to the location of the mobile unit in the service area;
   (b) computing the probability of the mobile unit being at a specific location in the service area in response to said received attribute information using a likelihood probability function;

(c) generating an output indicative of the likelihood of the mobile unit being at said location in the service area;

wherein said attribute information comprises a pilot signal strength measurement of at least one visible pilot signal at said location of the mobile unit;

and following step (a) and before step (b), additionally including a step (d) of identifying a region A of support for the mobile unit in the service area and (e) identifying a set of possible pilot signals which can be detected by the mobile unit in said region of support;

and additionally including a step (f) of computing an approximation $\theta_{ij}(x,y)$ of the probability the mobile unit detects a pilot signal at said specific location (x,y) in said region A for all pilot signals in said set of possible pilot signals and where j is a sector of a multi-sector based station I in said region of support;

wherein $\theta_{ij}(x,y)$ is derived from an RF model for the RF power $R_{ij}(x,y)$ received by the mobile unit and where the model is of the form of $$R_{ij}(x,y)=T_{ij}G_{ij}(x,y)L_{ij}(x,y)F_{ij}(x,y)M_{ij}(x,y)$$

where $T_{ij}$ is the transmit power associated with sector j of base station I, $G_{ij}(x,y)$ is the antenna gain for the sector j of base station I along the direction pointing towards the location (x,y) within A, $L_{ij}(x,y)$ is the distance loss between the base station I associated with the sector j and the location (x,y) within A, $F_{ij}(x,y)$ is the shadow fading factor and $M_{ij}(x,y)$ is the measured noise factor;

wherein said attribute information comprises the measured visibility of a pilot signal transmitted from a base station and the likelihood probability function comprises an iterative Bayes-modified maximum likelihood (ML) estimator in the form of $$L_{BML}^s(x,y) \propto$$

$$L_{BML}^{s-1}(x,y) \prod_{ij \in K} \frac{[n_{ij}^{s-1} + \alpha_{ij}(x,y)]^{\mu_{ij}^s}[s-1-n_{ij}^{s-1}+\beta_{ij}(x,y)]^{1-\mu_{ij}^s}}{\alpha_{ij}(x,y)+\beta_{ij}(x,y)+s-1},$$

$$(x,y) \in A$$

where x and y comprise rectilinear coordinates in the service area A s is the number of measurement epochs, $\eta_{ij}^{s-1}$ is the number of times a pilot signal in section j of a multi-sector base station I is visible through the first s−1 measurement epochs, $\alpha_{ij}(x,y)$ and $\beta_{ij}(x,y)$ are parameters of a beta distribution, and $\mu_{ij}^s$ is equal to one or zero depending on whether the mobile unit can detect a pilot signal ij at measurement epoch s.

13. A method according to claim 12 where $$\alpha_{ij}(x,y) = \begin{cases} 1, & \text{if } \tilde{\theta}_{ij}(x,y) \leq 1/2 \\ \frac{\tilde{\theta}_{ij}(x,y)}{1-\tilde{\theta}_{ij}(x,y)}, & \text{if } \tilde{\theta}_{ij}(x,y) > 1/2 \end{cases}$$

$$\beta_{ij}(x,y) = \begin{cases} \frac{1-\tilde{\theta}_{ij}(x,y)}{\tilde{\theta}_{ij}(x,y)}, & \text{if } \tilde{\theta}_{ij}(x,y) \leq 1/2 \\ 1, & \text{if } \tilde{\theta}_{ij}(x,y) > 1/2 \end{cases}.$$

14. A method according to claim 11 wherein the frequentist likelihood function $L_{ML}^s(x,y)$ is combined with a discrete uniform prior distribution for the location of the mobile unit of the form $$P_{ML}^0(x,y) = \frac{1}{\|A\|}, (x,y) \in A$$

to generate a sequential Bayesian procedure which provides a posterior distribution for the location of the mobile unit of the form $$P_{ML}^s(x,y) \propto P_{ML}^{s-1}(x,y) \prod_{ij \in K} [\tilde{\theta}_{ij}(x,y)]^{\mu_{ij}^s} [1-\tilde{\theta}_{ij}(x,y)]^{1-\mu_{ij}^s}, (x,y) \in A.$$

where $\|A\|$ is the number of grid points contained within A, and where x and y comprise rectilinear coordinates in the service area A, s is the number of measurement epochs, and $\mu_{ij}^s$ is equal to one or zero depending on whether the mobile unit can detect a pilot signal ij at measurement epoch s.

15. A method of predicting the location of a CDMA mobile communications unit in a wireless communications service area, comprising the steps of:

(a) receiving measure attribute information from a mobile unit location in the service area, said attribute information being specific to the location of the mobile unit in the service area;

(b) computing the probability of the mobile unit being at a specific location in the service area in response to said received attribute information using a likelihood probability function;

(c) generating an output indicative of the likelihood of the mobile unit being at said location in the service area;

wherein said attribute information comprises a pilot signal strength measurement of at least one visible pilot signal at said location of the mobile unit;

and following step (a) and before step (b), additionally including a step (d) of identifying a region A of support for the mobile unit in the service area and (e) identifying a set of possible pilot signals which can be detected by the mobile unit in said region of support;

and additionally including a step (f) of computing an approximation $\theta_{ij}(x,y)$ of the probability the mobile unit detects a pilot signal at said specific location (x,y) in said region A for all pilot signals in said set of possible pilot signals and where j is a sector of a multi-sector based station I in said region of support;

wherein $\theta_{ij}(x,y)$ is derived from an RF model for the RF power $R_{ij}(x,y)$ received by the mobile unit and where the model is of the form of $$R_{ij}(x,y)=T_{ij}G_{ij}(x,y)L_{ij}(x,y)F_{ij}(x,y)M_{ij}(x,y)$$

where $T_{ij}$ is the transmit power associated with sector j of base station I, $G_{ij}(x,y)$ is the antenna gain for the sector j of base station I along the direction pointing towards the location (x,y) within A, $L_{ij}(x,y)$ is the distance loss between the base station I associated with the sector j and the location (x,y) within A, $F_{ij}(x,y)$ is the shadow fading factor and $M_{ij}(x,y)$ is the measured noise factor;

wherein the frequentist likelihood function $L_{BML}^s(x,y)$ is combined with a discrete uniform prior distribution for the location of the mobile unit of the form $$P_{BML}^0(x, y) = \frac{1}{\|A\|}, (x, y) \in A$$

to generate a sequential Bayesian procedure which provides a posterior distribution for the location of the mobile unit of the form $$P_{BML}^s(x, y) \propto$$

$$P_{BML}^{s-1}(x, y) \prod_{ij \in K} \frac{[n_{ij}^{s-1} + \alpha_{ij}(x, y)]^{\mu_{ij}^s}[s - 1 - n_{ij}^{s-1} + \beta_{ij}(x, y)]^{1-\mu_{ij}^s}}{\alpha_{ij}(x, y) + \beta_{ij}(x, y) + s - 1},$$

$(x, y) \in A.$ where $\|A\|$ is the number of grid points contained within A, and where x and y comprise rectilinear coordinates in the service area A, s is the number of measurement epochs, n is the number of times a pilot signal in section j of a multi-sector base station I is visible through the first s−1 measurement epochs, $\alpha_{ij}(x,y)$ and $\beta_{ij}(x,y)$ are parameters of a beta distribution, and $\mu_{ij}^s$ is equal to one or zero depending on whether the mobile unit can detect a pilot signal ij at measurement epoch s.

16. A method according to claim 15 where $$\alpha_{ij}(x, y) = \begin{cases} 1, & \text{if } \tilde{\theta}_{ij}(x, y) \leq 1/2 \\ \dfrac{\tilde{\theta}_{ij}(x, y)}{1 - \tilde{\theta}_{ij}(x, y)}, & \text{if } \tilde{\theta}_{ij}(x, y) > 1/2 \end{cases}$$

$$\beta_{ij}(x, y) = \begin{cases} \dfrac{1 - \tilde{\theta}_{ij}(x, y)}{\tilde{\theta}_{ij}(x, y)}, & \text{if } \tilde{\theta}_{ij}(x, y) \leq 1/2 \\ 1, & \text{if } \tilde{\theta}_{ij}(x, y) > 1/2 \end{cases}.$$

\* \* \* \* \*